July 22, 1941.  B. P. LOCKWOOD  2,250,269
REEL MECHANISM
Filed Aug. 1, 1940  2 Sheets-Sheet 1
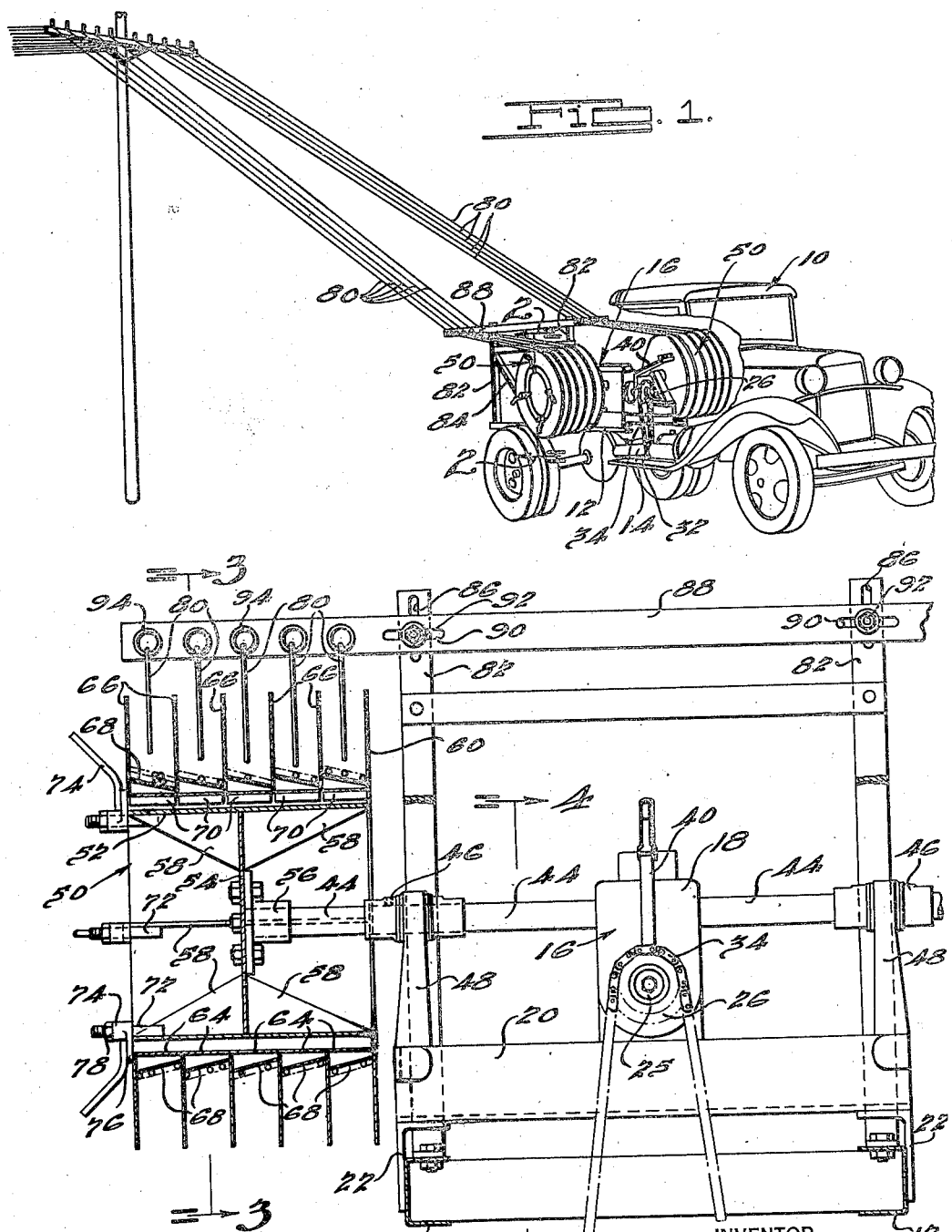
INVENTOR
Benjamin P. Lockwood.
BY
Harness Dickey & Pierce
ATTORNEYS.

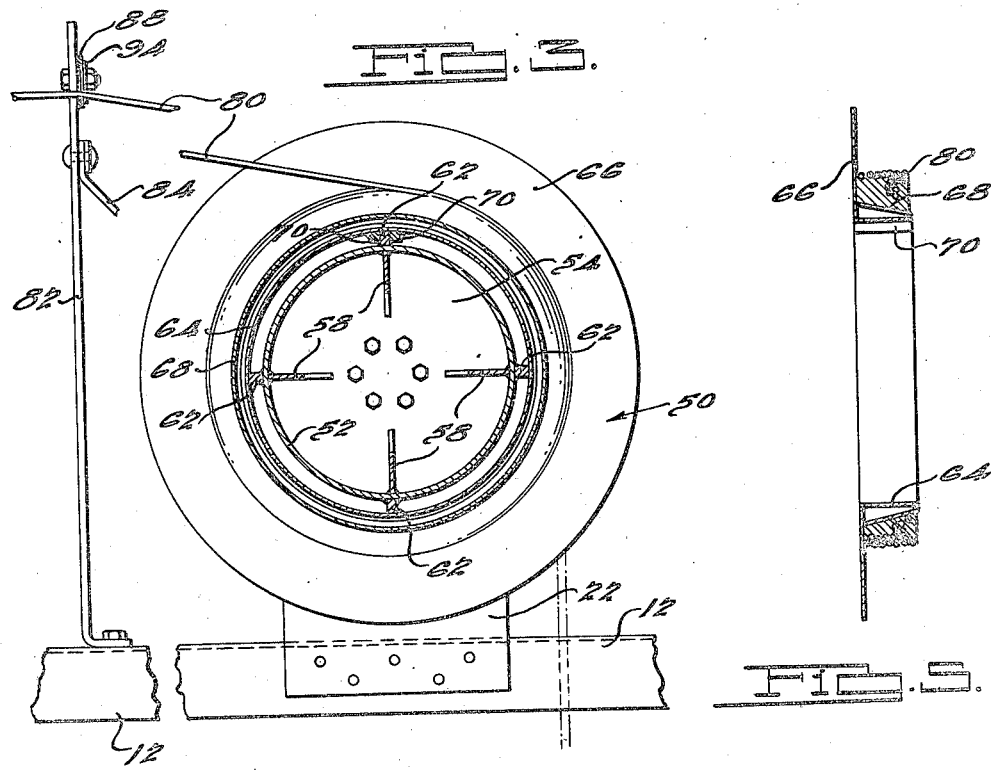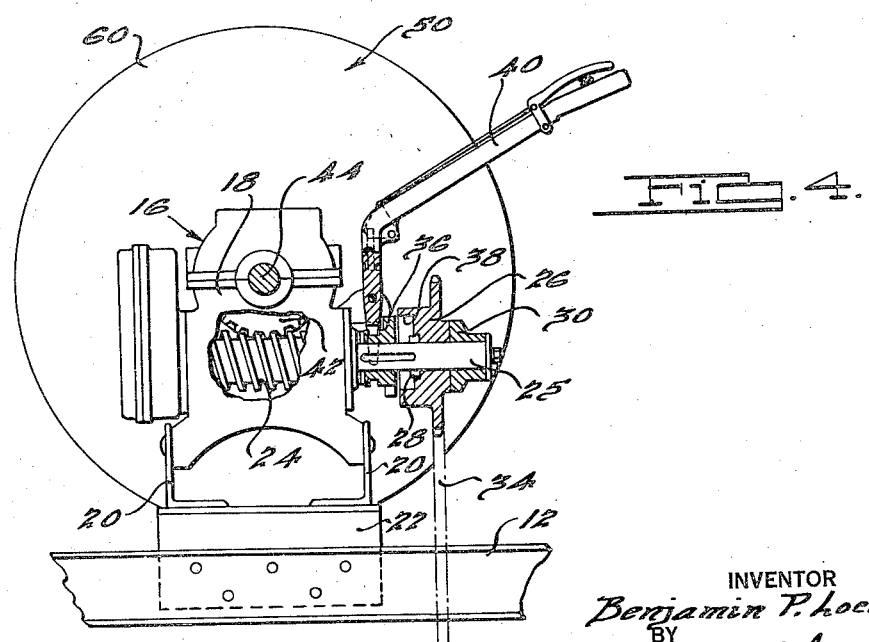

Patented July 22, 1941

2,250,269

UNITED STATES PATENT OFFICE 2,250,269

REEL MECHANISM

Benjamin P. Lockwood, Tampa, Fla.

Application August 1, 1940, Serial No. 349,096

11 Claims. (Cl. 242—85)

The present invention relates to an overhead wire reclaiming winch and particularly relates to an improved reel construction therefor.

One of the primary objects of the present invention is to provide an improved and simplified reel unit for use in reclaiming overhead wires whereby a plurality of such wires may be readily and simultaneously coiled in individual coils.

Another object of the invention is to provide an improved reel unit of the type mentioned in which the individual coils may be easily removed from the reel.

Another object of the invention is to provide an improved reel unit of the type mentioned in which a plurality of similar reel elements may be mounted on a single drive drum so that the number of such reel elements may be varied or the number of individual coils being reeled may be varied.

Other objects of the invention will become apparent from the following specification, the drawings relating thereto, and from the claims hereinafter set forth.

In the drawings, in which like numerals are used to designate like parts in the several views throughout:

Figure 1 is a perspective view of an automotive truck having reeling mechanism according to the present invention mounted thereon and showing such truck in one illustrative use with respect to reclaiming overhead telephone wires;

Figure 2 is a fragmentary, cross-sectonal view with parts in elevation, taken substantially along the line 2—2 of Fig. 1;

Figure 3 is a broken, cross-sectional view taken substantially along the line 3—3 of Figure 2;

Figure 4 is a cross-sectional view and elevational view with parts removed taken substantially along the line 4—4 of Figure 2; and Figure 5 is a vertical, cross-sectional view taken through one of the reel members illustrating the wire coiled thereon.

Referring to the drawings, an automotive truck is generally indicated at 10 in Figure 1 and includes the usual chassis 12 and drive shaft 14 extending from the engine toward the rear of the truck under the chassis 12. Reeling mechanism generally indicated at 16 is mounted adjacent the rear end of the truck and on the chassis 12.

Such reeling mechanism includes drive means comprising a housing 18 which is mounted on angle members 20 which, in turn, are mounted upon side angle members 22. Such members 22 are suitably fixed to the chassis 12.

A worm 24 is rotatably mounted within the housing 18 in the usual way and has a worm shaft 25 projecting through the forward end of the casing 18. A sprocket wheel 26 is freely mounted upon shaft 25 for rotation with respect thereto, and is held against axial movement with respect thereto by means of a collar 28 and a hub member 30. The sprocket 26 is connected to another sprocket wheel 32 by means of a sprocket chain 34. The sprocket wheel 32 is connected to a power take-off in the usual way to drive the sprocket wheel 26.

A slidable clutch element 36 is keyed to the worm shaft 25 and is adapted to be moved into and out of cooperative relationship with a complementary clutch portion 38 of the sprocket wheel 26 by means of a clutch lever 40 which is connected to the clutch 36 in the usual way. It will thus be seen that by shifting the clutch lever 40 so that the clutch elements 36 and 38 are in engagement, the worm shaft 25 is driven through the sprocket 26 and the worm 24 is correspondingly driven.

A worm gear 42 is mounted upon a drive shaft 44 above the worm 24 and is in mesh therewith so that as the worm 24 is driven, the worm gear 42 and drive shaft 44 are correspondingly driven. The drive shaft 44 extends transversely of the chassis 12 to opposite sides of the vehicle and is mounted within suitable bearings 46 which, in turn, are supported by upstanding brackets 48 connected to the chassis 12 through members 20 and 22.

Reeling units, generally indicated at 50, are mounted on the outer ends of the drive shaft 44 at oppostie sides of the chassis. Each of such units 50 includes a cylindrical drive member 52 having a circular plate member 54 disposed within the member 52 at a point substantially midway between the ends thereof which is welded to the inner wall of member 52 at the periphery of member 54. A drive spool hub 56 is connected to the plate member 54 by suitable means, such as nuts and bolts, and is aligned with the axis of member 52. Each hub member 56 is, in turn, connected to the adjacent end of drive shaft 44 so that member 52 is driven upon rotation of shaft 44. Axially extending, reinforcing gusset plates 58 have one of their edges welded to the inner face of member 52 and have one of their other edges welded to the plate member 54 so that a rugged yet light weight drive spool construction is provided.

An annular sheet or plate member 60 is welded to the member 52 adjacent the inner edge thereof and extends radially outwardly therebeyond. Such member 60 is preferably circular and is provided with a central opening therethrough for the reception of shaft 44.

A plurality of bar members 62 are welded to the outer face of cylindrical member 52 at equal intervals therearound, there being four of such bar members 62 shown in the embodiment illustrated. Such members 62 extend radially outwardly beyond the peripheral surface of member 52 and serve to support the individual reels thereon and provide the driving engagement between such individual reels and the drive spool.

A plurality of separable and individual reels, such as shown in Figure 5, are slidably mounted upon the cylindrical member 52 in driven engagement therewith. Each of such reels includes a central, cylindrical member 64, having an inside diameter substantially equal to the diametric distance between the outer edges of diametrically opposed bar members 62. Radially extending, flat ring members 66 are provided which have a central opening therethrough with a diameter substantially equal to the outside diameter of the member 64. Each such member 66 embraces the member 64 adjacent one edge thereof and is welded thereto. A base member 68, which is frusto conical in shape, embraces the member 64. The larger diameter end of such member 68 is welded to the member 66, and the smaller diameter end is welded to the opposite end of member 64. It will thus be seen that the base member 68 is frusto conical in shape and tapers axially inwardly, away from the member 66 and terminates adjacent the opposite edge of member 64.

A pair of bar members 70 are welded to the inner wall of member 64 with the adjacent faces of such members 70 in spaced relation to each other so that such faces bear against and cooperate with one of the bar members 62 to provide the driving engagement between the reels and the driving spool.

It will thus be seen that the reels are slidably disposed over the outer ends of the cylindrical member 52 so that the bar members 70 engage one of the bar members 62 and so that the members 64 rest upon members 62. The first reel is so disposed that one edge of its member 68 abuts against the adjacent face of member 60. Each of the other reels may be successively applied so that the open edge of member 68 abuts against the face of member 66 of the preceding reel, in the relationship best shown in Figure 2.

The reels are held in such abutting relationship and against axial movement with respect to the member 52 by means including bolts 72 having their inner ends welded to the inner wall of member 52 and member 58 in one of the corners formed at the juncture of such members. Such bolts 72 project outwardly beyond the edge of member 50 and threadably receive thereon fastening members or clamps 74. Such clamps 74 have outwardly projecting portions 76 formed integral therewith which are adapted to tightly bear against the outermost reel and hold all of the reels in abutting relationship and against axial movement. Lock nuts 78 are preferably provided to prevent the clamps 74 from becoming loose.

From the structure so far described, it can be seen that the reels are separable from each other and may be individually removed from driving engagement with the driving spools. Each reel is adapted to have wound thereon an individual wire such as one of those indicated at 80, which in the embodiment illustrated are overhead telephone wires. Such wires are wound on the individual drums in the form of separate coils, as shown in Fig. 5. It will thus be seen that as the individual reels are removed from the driving spool, such reels are separable from each other and the separate coils may be readily slipped from the ends of the reels as will be readily appreciated from an inspection of Fig. 5.

In order to support and guide the individual strands of wire 80 with respect to their corresponding reels, supporting and guide means are provided. Such supporting and guide means include upstanding guide bar supports 82 which are mounted on the chassis 12 adjacent the rear end thereof and which are braced by brace members 84. Such brace members 84 are fixed to their corresponding uprights 82 intermediate the ends of such uprights and are also suitably fixed to the chassis. Each of the upright members 82 is provided with an elongated slot 86 adjacent the upper end thereof.

A transversely extending wire guide bar 88 is provided with elongated slots 90 therein and such slots are adapted to cross the slots 86 in the uprights 82. Securing means, illustrated in the form of nuts and bolts 92, are adapted to extend through the slots 90 and 86 and thus mount the guide bar 88 on the supports 82. It will be appreciated that by properly positioning the slots 86 and 90 with respect to each other that the guide bar 88 may be adjusted vertically and transversely within limits.

The guide bar 88 is provided with a plurality of apertures therein within which wire guide bushings 94 are fixed. Such apertures and bushings are provided at both ends of the bar 88 and are adapted to be aligned with their corresponding reels so that the individual wires for the respective reels will be properly guided as the wires are mounted thereon.

Formal changes may be made in the specific embodiment of the invention without departing from the spirit of the invention, the scope of which is commensurate with the appended claims.

What I claim is:

1. A reeling mechanism comprising, a central, cylindrical drive member, a plurality of separable reel members slidably disposed on said drive member in driven engagement therewith, each of said reel members including a radially extending plate member on one edge thereof and an annular base member tapered inwardly and away from said plate member to the other edge thereof, said other edge of said reel members abutting against the adjacent plate member of the adjacent reel member.

2. A reeling mechanism comprising, a central, cylindrical drive member, a plurality of separable reel members slidably disposed on said drive member in driven engagement therewith, each of said reel members including a radially extending plate member on one edge thereof and an annular base member tapered inwardly and away from said plate member to the other edge thereof, said other edge of said reel members abutting against the adjacent plate member of the adjacent reel member, and means for securing said reel members in abutting relationship and against axial movement with respect to said drive member.

3. A reeling mechanism comprising, a central, cylindrical drive member, a plurality of bar members secured to the outside of said drive member and extending axially thereof substantially parallel with the axis of said drive member, a plurality of separable reel members slidably disposed over one end of said drive member in driven engagement therewith, each of said reel members including an inner cylindrical member which bears against said bar members, means fixed to the inside of said last named cylindrical member engaging one of said bar members to provide driving engagement between said reel members and said drive member, each of said reel members including a radially extending plate member on one edge thereof and an annular base member tapered inwardly and away from said plate member to the other edge thereof.

4. A reeling mechanism comprising, a central, cylindrical drive member, a plurality of bar members secured to the outside of said drive member and extending axially thereof substantially parallel with the axis of said drive member, a plurality of separable reel members slidably disposed over one end of said drive member in driven engagement therewith, each of said reel members including an inner cylindrical member which bears against said bar members, means fixed to the inside of said last named cylindrical member engaging one of said bar members to provide driving engagement between said reel members and said drive member, each of said reel members including a radially extending plate member on one edge thereof and an annular base member tapered inwardly and away from said plate member to the other edge thereof, said reel members being so disposed on said drive member that said other edge of each of said reel members abuts against the adjacent plate member on the adjacent reel member, and means for fixing said reel members in such abutting relationship and against axial movement with respect to said drive member.

5. A reeling mechanism comprising, a central, cylindrical drive member, a plurality of bar members secured to the outside of said drive member and extending axially thereof substantially parallel with the axis of said drive member, a plurality of separable reel members slidably disposed over one end of said drive member in driven engagement therewith, each of said reel members including an inner cylindrical member which bears against said bar members, means fixed to the inside of said last named cylindrical member engaging one of said bar members to provide driving engagement between said reel members and said drive member, each of said reel members including a radially extending plate member on one edge thereof and an annular base member tapered inwardly and away from said plate member to the other edge thereof, said reel members being so disposed on said drive member that said other edge of each of said reel members abuts against the adjacent plate member on the adjacent reel member, and means for fixing said reel members in such abutting relationship and against axial movement with respect to said drive member, means for driving said drive member, and guide means disposed adjacent said reel members, said guide means having guide portions aligned with and individual to said reel members respectively.

6. A reeling mechanism comprising a central drive member, a reel removably mounted on said drive member, means providing a driving connection between said member and said reel, said reel including a radially extending plate member on one edge thereof and a frusto conical base member having the larger diameter end fixed to said plate member, and another radially extending plate member mounted on said drive member adjacent the smaller diameter end of said base member and abutting thereagainst, said reel member being separable from said another plate member.

7. A reeling mechanism comprising a central drive member, a reel removably mounted on said drive member, means providing a driving connection between said member and said reel, said reel including a radially extending plate member on one edge thereof and a frusto conical base member having the larger diameter end fixed to said plate member, another radially extending plate member mounted on said drive member adjacent the smaller diameter end of said base member and abutting thereagainst, said reel being separable from said another plate member, and releasable means for securing the reel in abutting relationship with said another plate member and against axial movement.

8. A reeling mechanism comprising, a central drive member, a plurality of separable reel members slidably disposed on said drive member in driven engagement therewith, each of said reel members including a radially extending plate member on one edge thereof and an annular base member tapered inwardly and away from said plate member to the other edge thereof, said other edge of said reel members abutting against the adjacent plate member of the adjacent reel member.

9. A reeling mechanism comprising, a central drive member, a plurality of separable reel members slidably disposed on said drive member in driven engagement therewith, each of said reel members including a radially extending plate member on one edge thereof and an annular base member tapered inwardly and away from said plate member to the other edge thereof, said other edge of said reel members abutting against the adjacent plate member of the adjacent reel member, and means for securing said reel members in abutting relationship and against axial movement with respect to said drive member.

10. A reeling mechanism comprising a central drive member, a bar member secured to the outside of said drive member and extending axially thereof substantially parallel with the axis of said drive member, a reel slidably disposed over one end of said drive member in driving engagement with said bar member, said reel member including an inner cylindrical member which bears against said bar member, means fixed to the inside of said last named cylindrical member engaging said bar member to provide driving engagement between said reel member and said drive member, said reel member including a radially extending plate member on one edge thereof and an annular base member tapered inwardly and away from said plate member to the other edge thereof.

11. A reeling mechanism comprising a central cylindrical drive member, a bar member secured to the outside of said drive member and extending axially thereof substantially parallel with the axis of said drive member, a plurality of separable reel members slidably and removably disposed over one end of said drive member in driven engagement therewith, each of said reel members including an inner cylindrical member which bears against said bar member, means providing a driving connection between said bar member and said reel members, each of said reel members including a radially extending plate member on one edge thereof and an annular base member tapered inwardly and away from said plate member to the other edge thereof, said other edge of each of said reel members abutting against the adjacent plate member of the adjacent reel member, and releasable means for securing said reel members in abutting relationship and against axial movement with respect to said drive member.

BENJAMIN P. LOCKWOOD.